Aug. 9, 1927.

P. W. FENTON 1,638,687

GASOLINE DISPENSING APPARATUS

Filed Aug. 5, 1925

INVENTOR
PAUL W. FENTON
BY
ATTORNEY

Patented Aug. 9, 1927.

1,638,687

UNITED STATES PATENT OFFICE.

PAUL W. FENTON, OF NEW YORK, N. Y.

GASOLINE-DISPENSING APPARATUS.

Application filed August 5, 1925. Serial No. 48,203.

The invention relates to measuring pumps for dispensing gasoline and other oils and more especially to apparatus in which the dispensing is accomplished by means of a piston type measuring pump, the liquid being dispensed thru a delivery hose or the like.

It has been found that in the operation of these pumps it is usually not possible to rely on perfect tightness of the valves thereof or of the pipes connected therewith; and consequently a correct delivery of the gasoline or oil cannot be assured after the pump has stood unused for a number of hours, as for example over night. Thus the first customer of the morning may receive short measure although a complete stroke of the pump is made and the full quantity supposed to be delivered is registered on the meter associated therewith.

It is the object of the present invention to equip a "defined-stroke piston type" of measuring pump with means which will provide for accurate discharge of selected quantities of gasoline or other liquid; and, also, to indicate to a purchaser whether the exact amount purchased will be supplied thru the delivery hose. The invention contemplates, moreover, the provision of a section thru which the gasoline passes which will admit of viewing the same, so that a purchaser may not only be enabled to check up the color of the liquid, where colored varieties are dispensed; but, also will be enabled to satisfy himself that the liquid is in motion. A further object of the invention consists in thus equipping dispensing apparatus in such a manner as to permit operation thereof without affecting the registering device for metering the total quantity supplied thru the pump, thereby retaining accuracy of the meter readings.

To this end, the invention consists in by-passing the pump with supplementary pumping mechanism which may be operated when necessary to replenish an auxiliary reservoir, the latter supplying, automatically as required, the gasoline or oil to the dispensing chamber in which a level of said gasoline is to be automatically maintained thru the aforesaid auxiliary supply; also, in providing the dispensing chamber with a transparent portion, and within said chamber providing also a movable member to be actuated by the liquid in passing thru the said chamber.

The nature of the invention, however, will best be understood when described in connection with the accompanying drawings, in which—

Figure 2:
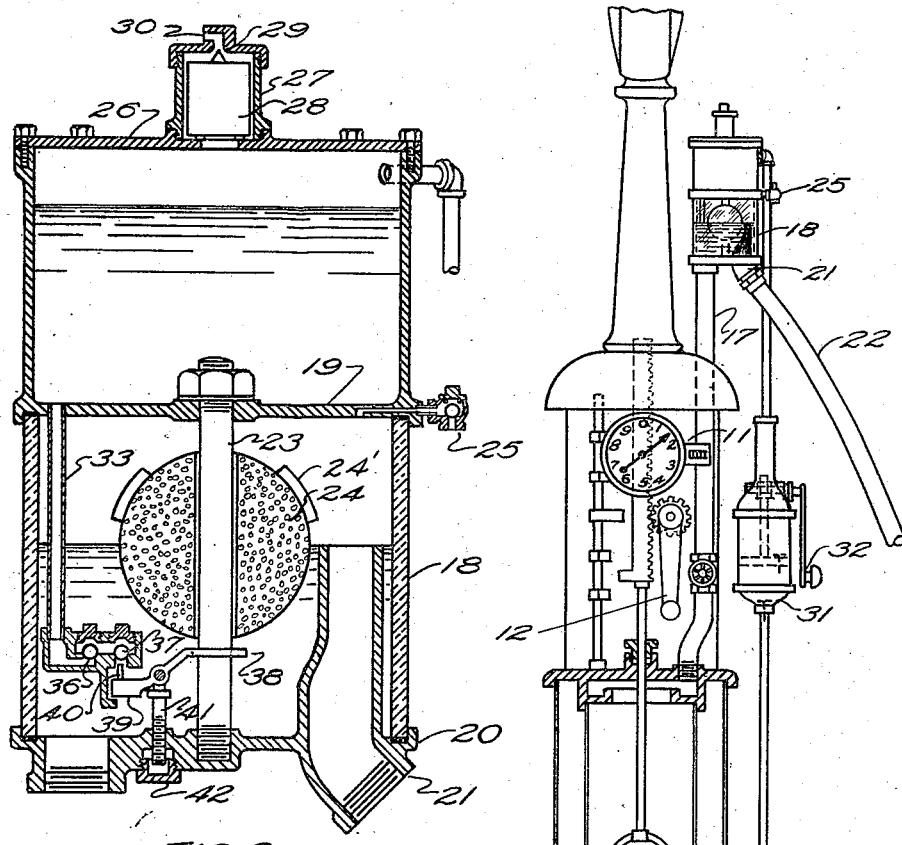
Fig. 2 is a fragmentary detail section of an improved dispensing chamber for said pump with auxiliary reservoir therefor attached.
Figure 1:
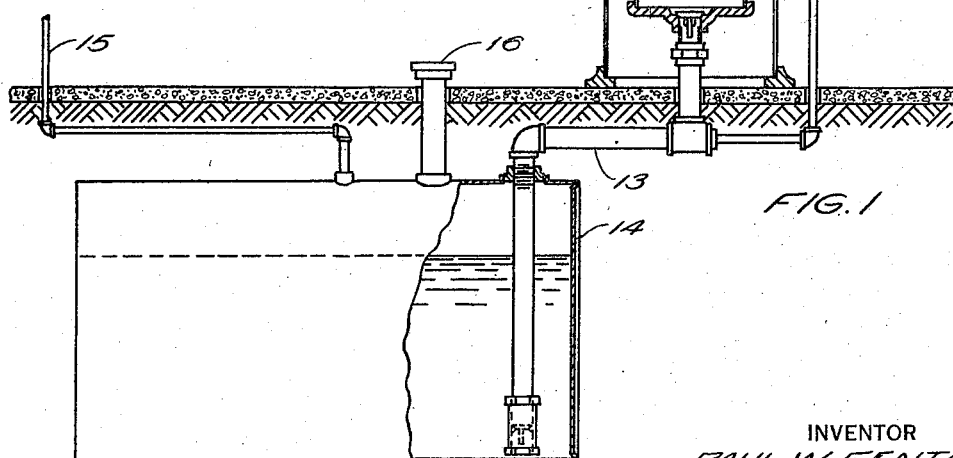
Fig. 1 is a front elevation of a piston type pump installation equipped with the novel supplementary apparatus.

Referring to the drawings, 10 designates the body of a typical gasoline measuring pump of the "defined-stroke piston type", having the usual individual sales counter and totalizing metering device 11 operated together with the dispensing of the gasoline or oil by a crank handle 12 in accordance with the pump strokes. This pump is adapted, as is the usual practice, to be connected thru a suction pipe 13 with the supply tank 14 which is generally buried below the surface of the ground and has a vent tube 15 and a fill pipe 16, both projecting above the ground.

From the top of the cylinder of the pump, a stand pipe 17 is carried to a casing 18 providing a dispensing chamber for the gasoline. This chamber comprises preferably an upper and lower cover member 19 and 20 respectively, between which and the necessary gaskets is retained a cylinder of glass or other transparent material in order to admit of viewing the contents and checking the static level. Into said chamber projects the delivery pipe 21 whose outer end is connected with a delivery hose 22 thru which the gasoline is to be dispensed. A bolt 23 passing axially thru this chamber serves not only to maintain the assembly of the said chamber but provides also a guide for a float member or hollow ball indicator 24 which is rotatably mounted thereon as well as movable vertically in accordance with the level of the liquid in said chamber. The usual vent valve 25 is provided, also, at the top of the casing for clearing the delivery hose 22. Furthermore, fins 24' are provided over the outer surface of the ball 24 and serve to set the same in motion when the liquid is passing thru the chamber.

It is the object of the present invention to maintain always a predetermined level of such liquid in said dispensing chamber, the same being determined by the position of the outlet opening of the delivery pipe 21 which projects therein. This is necessary in order that in operating the pump to vend the gasoline, a full delivery will be had—the customer being able to satisfy himself on this point in view of the transparent container hereinbefore set forth and, further, as by suitable indications (not shown) which may be placed on the float to cooperate with suitable markings (not shown) on the glass cylinder.

In order to maintain at all times the aforesaid level, which is to be automatically provided for, an auxiliary chamber is to be associated with the casing 18, the top cover 19 thereof having for this purpose an upwardly extending cylindrical portion for retaining an additional supply of the gasoline which portion is closed by a top cover member 26. The said cover 26 carries also a venting chamber 27 communicating with the auxiliary chamber in which venting chamber is provided a float member 28 having a valve at its upper end adapted to seat in the valve seat 29 of a vent 30.

To provide for the supply of the additional gasoline for said auxiliary chamber, a refiller means as a supplementary pump 31 of relatively small capacity is arranged to be connected thereto and by-pass the main supply thru the measuring cylinder of pump 10, being connected for this purpose with the suction line as to the pipe 13 thereof, or directly to the tank if desired. Therefore, by operating the handle 32 of the supplementary pump, gasoline will be drawn directly from the tank 14 and discharged into the auxiliary reservoir which may thus be supplied with the desired volume of gasoline, the capacity of said reservoir being suited to the conditions. It will be appreciated, also, that this supply of gasoline is not metered but is merely employed to make up any deficiency in the supply provided thru the usual apparatus and which is metered. In order to render this auxiliary supply available as required, the dispensing chamber is arranged to be connected with the auxiliary chamber as thru a pipe 33, and including an interposed double check valve, the latter being mounted in the lower portion of the dispensing chamber. The said double check valve comprises two oppositely acting valves 36 and 37, the former normally permitting flow of liquid from the auxiliary chamber to the dispensing chamber, while the latter seals off such supply until opened in manner hereinafter set forth. The valve 36, furthermore, is designed to prevent a supply of gasoline backing up into the auxiliary chamber during the dispensing of the gasoline from the dispensing chamber.

Should the level in this latter chamber fall below the predetermined height, as determined by the top of outlet opening of the delivery pipe 21, the float member 24 will drop downwardly and into a position in which it engages the one arm 38 of a lever whose other arm 39 carries a pin 40 adapted to engage with the ball check 37 to lift the same off its seat and thus permit the flow therethru of gasoline until the proper level is again restored in the dispensing chamber and the float no longer exerts pressure upon the said arm 38. The lever as a whole is made adjustable, furthermore, in that the same is fulcrumed on a screw member 41 whose head projects beyond the bottom cover member and into which it is threaded so as to be accessible for adjustment vertically. A cap 42 may be mounted thereover in the bottom cover to seal off the screw head.

By the aforesaid provision of a supplementary by-passing pump associated with the auxiliary supply tank, the level of the gasoline in the dispensing chamber may automatically be maintained and the condition of the liquid therein is at all times visible to the purchaser thru the glass walled dispensing chamber; and will reveal, moreover, any leaks in the pump or foot valves and back leaks in the buried pipes. The apparatus, furthermore, is readily attachable to existing pumps and does not interfere in any way with the operation of the same, while affording accurate metering of the gasoline dispensed.

I claim:—

1. In dispensing apparatus of the character described including a liquid dispensing pump with dispensing chamber communicating therewith and provided with an outlet: means to maintain automatically in the dispensing chamber thereof and while the pump is at rest a predetermined level of the liquid; and supplementary means associated therewith for affording independently of the dispensing pump a supply of liquid to the said means for maintaining the predetermined level.

2. In dispensing apparatus of the character described including a liquid dispensing pump: a casing providing a dispensing chamber communicating with the pump and provided with an outlet, said casing having a sight opening therein; means to maintain automatically in the dispensing chamber and while the pump is at rest a predetermined level of the liquid; and supplementary pumping means associated therewith for affording independently of the dispensing pump a supply of liquid to the said means for maintaining the predetermined level.

3. In dispensing apparatus of the character described including a liquid dispensing pump: a casing providing a dispensing chamber communicating with the pump and provided with an outlet; an auxiliary chamber above said dispensing chamber and communicating therewith; means operated by the level of the liquid in the dispensing chamber for controlling said communication between the two chambers; and supplementary pumping means associated with said auxiliary chamber for affording independently of the dispensing pump a supply of liquid thereto.

4. In dispensing apparatus of the character described including a liquid dispensing pump: a casing providing a dispensing chamber communicating with the pump and provided with an outlet, said casing comprising a glass cylinder, top and bottom cover plates therefor, and a bolt passing thru said cylinder and the cover plates to secure the same to one another, a float member guided on said bolt; a double check valve mounted in said chamber and controlled by the action of said float; a casing mounted above said dispensing chamber to provide an auxiliary chamber communicating with the dispensing chamber thru said double check valve; and supplementary pumping means associated with said auxiliary chamber for affording independently of the dispensing pump a supply of liquid thereto.

5. In dispensing apparatus of the character described including a liquid dispensing pump: a casing providing a dispensing chamber communicating with the pump and provided with an outlet, said casing comprising a glass cylinder, top and bottom cover plates therefor, and a bolt passing thru said cylinder and the cover plates to secure the same to one another; a float member guided on said bolt; a double check valve mounted in said chamber and controlled by the action of said float; a second casing comprising an extension of the upper of said covers and a cover closing the same to provide an auxiliary chamber communicating with the dispensing chamber thru said double check valve; a float controlled venting valve secured to said cover plate of the auxiliary chamber; and supplementary pumping means associated with said auxiliary chamber for affording independently of the dispensing pump a supply of liquid thereto.

In testimony whereof I affix my signature.

PAUL W. FENTON.